US011248870B1

(12) United States Patent
Nagy-Zambo et al.

(10) Patent No.: US 11,248,870 B1
(45) Date of Patent: Feb. 15, 2022

(54) MUZZLE DEVICE

(71) Applicant: KAN Holdings Inc., Guelph (CA)

(72) Inventors: Csaba Nagy-Zambo, Guelph (CA); Zoltan Kovacs, Guelph (CA)

(73) Assignee: KAN Holdings Inc., Guelph (CA)

( * ) Notice: Subject to any disclaimer, the term of this patent is extended or adjusted under 35 U.S.C. 154(b) by 0 days.

(21) Appl. No.: 17/217,543

(22) Filed: Mar. 30, 2021

Related U.S. Application Data

(60) Provisional application No. 63/072,681, filed on Aug. 31, 2020.

(51) Int. Cl.
*F41A 21/34* (2006.01)
*F41A 21/30* (2006.01)
*B33Y 80/00* (2015.01)

(52) U.S. Cl.
CPC .............. *F41A 21/34* (2013.01); *F41A 21/30* (2013.01); *B33Y 80/00* (2014.12)

(58) Field of Classification Search
CPC ........... F41A 21/34; F41A 21/30; B33Y 80/00
See application file for complete search history.

(56) References Cited

U.S. PATENT DOCUMENTS

| | | | |
|---|---|---|---|
| 2,812,693 A * | 11/1957 | Hartley | F41A 21/20 89/14.3 |
| 6,298,764 B1 | 10/2001 | Sherman et al. | |
| 8,307,946 B1 | 11/2012 | Johnston | |
| 9,982,959 B2 * | 5/2018 | Washburn, III | F41A 21/30 |
| 10,487,961 B2 * | 11/2019 | Eilers | F16L 55/02 |
| 10,690,431 B2 * | 6/2020 | Washburn, III | B22F 7/004 |
| 2014/0014493 A1 * | 1/2014 | Ryan | B01D 61/364 203/89 |
| 2018/0340643 A1 | 11/2018 | Gabriel et al. | |
| 2019/0145298 A1 * | 5/2019 | Abu Al-Rub | B01D 53/34 55/523 |
| 2020/0023433 A1 | 1/2020 | Lewis et al. | |
| 2020/0263947 A1 * | 8/2020 | Calderwood | F41A 21/36 |

FOREIGN PATENT DOCUMENTS

| | | | | |
|---|---|---|---|---|
| CN | 112129162 A | * | 12/2020 | |
| EP | 3436674 B1 | | 4/2021 | |
| WO | WO-2018069884 A1 | * | 4/2018 | F41A 21/30 |

* cited by examiner

*Primary Examiner* — Joshua T Semick
(74) *Attorney, Agent, or Firm* — Sterne, Kessler, Goldstein & Fox P.L.L.C.

(57) ABSTRACT

A muzzle device for a firearm may include an additively manufactured body having a first end, a second end opposite the first end, and a central bore extending from the first end to the second end. The body may include a lattice of triply periodic minimal surfaces that define an interconnected network of channels extending through the body such that gases produced by the firearm may flow in a random pattern from the central bore through the interconnected network of channels to cool the gases.

16 Claims, 22 Drawing Sheets

MUZZLE DEVICE

CROSS REFERENCE TO RELATED APPLICATIONS

The present application claims the benefit of and priority to U.S. Provisional Patent App. No. 63/072,681, filed Aug. 31, 2020, which is incorporated herein by reference in its entirety for all purposes.

FIELD

Embodiments described herein generally relate to a firearm muzzle device. Specifically, embodiments described herein relate to an additively manufactured muzzle device that includes a triply periodic minimal surface.

BACKGROUND

Muzzle devices may be attached to a firearm in order to reduce the burst of light or "flash" produced when firing the firearm. The flash may make it difficult for the marksman to see after firing, particularly in low light conditions. The inability to see may cause the marksman to take longer between shots as the marksman may have to regain proper aim. Further, the flash may also indicate the location of the marksman, allowing others to determine the marksman's location. Some muzzle devices may be used to suppress the sound produced when the firearm is fired. The sound produced when firing the firearm may also indicate the location of the marksman. As a result, the safety of the marksman may be improved by reducing the brightness of the flash and/or the sound of the firearm which may otherwise indicate the marksman's location to others.

BRIEF SUMMARY

Some embodiments described herein relate to muzzle devices for a firearm that include an additively manufactured body having a first end, a second end opposite the first end, and a central bore extending from the first end to the second end. The body of the muzzle device may include a lattice of triply periodic minimal surfaces that define an interconnected network of channels extending through the body such that gases produced by the firearm may flow in a random pattern from the central bore through the interconnected network of channels to cool the gases.

In any of the various embodiments described herein, the muzzle device may further include a connector arranged at the first end of the body configured to secure the muzzle device to a barrel of the firearm.

In any of the various embodiments described herein, the triply periodic minimal surface can be selected from the group of Gyroid, Schwarz P, Diamond, Neovius, IWP, Schwarz D, PW hybrid, Holes, Icosahedron, L, and Schwarz G. In some embodiments, the triply periodic minimal surface can be a Gyroid.

In any of the various embodiments described herein, a surface area of the body can be in a range of approximately 7,000 mm$^2$ to approximately 28,000 mm$^2$. In some embodiments, the surface area of the body can be in a range of approximately 7,500 mm$^2$ to approximately 14,000 mm$^2$.

In any of the various embodiments described herein, the body may include a plurality of openings on the exterior surface of the body such that the gases flow through the interconnected network of channels and out of the muzzle device through the plurality of openings. In some embodiments, the plurality of openings may increase in diameter from the first end of the body toward the second end of the body.

Some embodiments described herein relate to muzzle devices for a firearm that include a body having a first end, a second end opposite the first end, and a central bore defined by the body and extending from the first end to the second end. The muzzle device can further include a tubular outer shell surrounding the body, wherein the body can include a lattice of triply periodic minimal surfaces that define an interconnected network of channels extending through the body so that gases produced by the firearm flows from the central bore into the interconnected network of channels.

In any of the various embodiments described herein, the outer shell may include a surface pattern.

In any of the various embodiments described herein, a surface area of the body may be in a range of approximately 7,000 mm$^2$ to approximately 28,000 mm$^2$.

In any of the various embodiments described herein, the outer shell may include a first material and the body may include a second material.

In any of the various embodiments described herein, the body may be additively manufactured from a metal powder. In some embodiments, the metal powder may be selected from the group of stainless steel, Inconel, and titanium.

Some embodiments described herein relate to a method of manufacturing a muzzle device, the method includes generating a computerized model of a muzzle device having a body having a triply periodic minimal surface, adjusting parameters of the computerized model to modify a physical property of the muzzle device, and additively manufacturing the muzzle device based on the computerized model by successively depositing and fusing layers of metal powder on a build platform.

In any of the various embodiments described herein, the additive manufacturing of the muzzle device can occur without support structures to support features of the muzzle device.

In any of the various embodiments described herein, the method may include additively manufacturing the muzzle device so that the body of the muzzle device includes an interconnected network of channels.

In any of the various embodiments described herein, the method may further include forming an outer shell surrounding the body of the muzzle device.

In any of the various embodiments described herein, the method may further include performing a surface treatment on the additively manufactured muzzle device.

In any of the various embodiments described herein, the physical property may include at least one of a weight, a surface area, and a surface roughness of the muzzle device.

In any of the various embodiments described herein, the method may further include adjusting a layer thickness used during additive manufacturing to adjust a surface roughness of the muzzle device.

In any of the various embodiments described herein, the layers of metal powder may have a thickness of 20 μm to 80 μm.

In any of the various embodiments described herein, a first part of the muzzle device may be additively manufactured with a first layer thickness and a second part of the muzzle device may be additively manufactured with a second layer thickness that differs from the first layer thickness.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
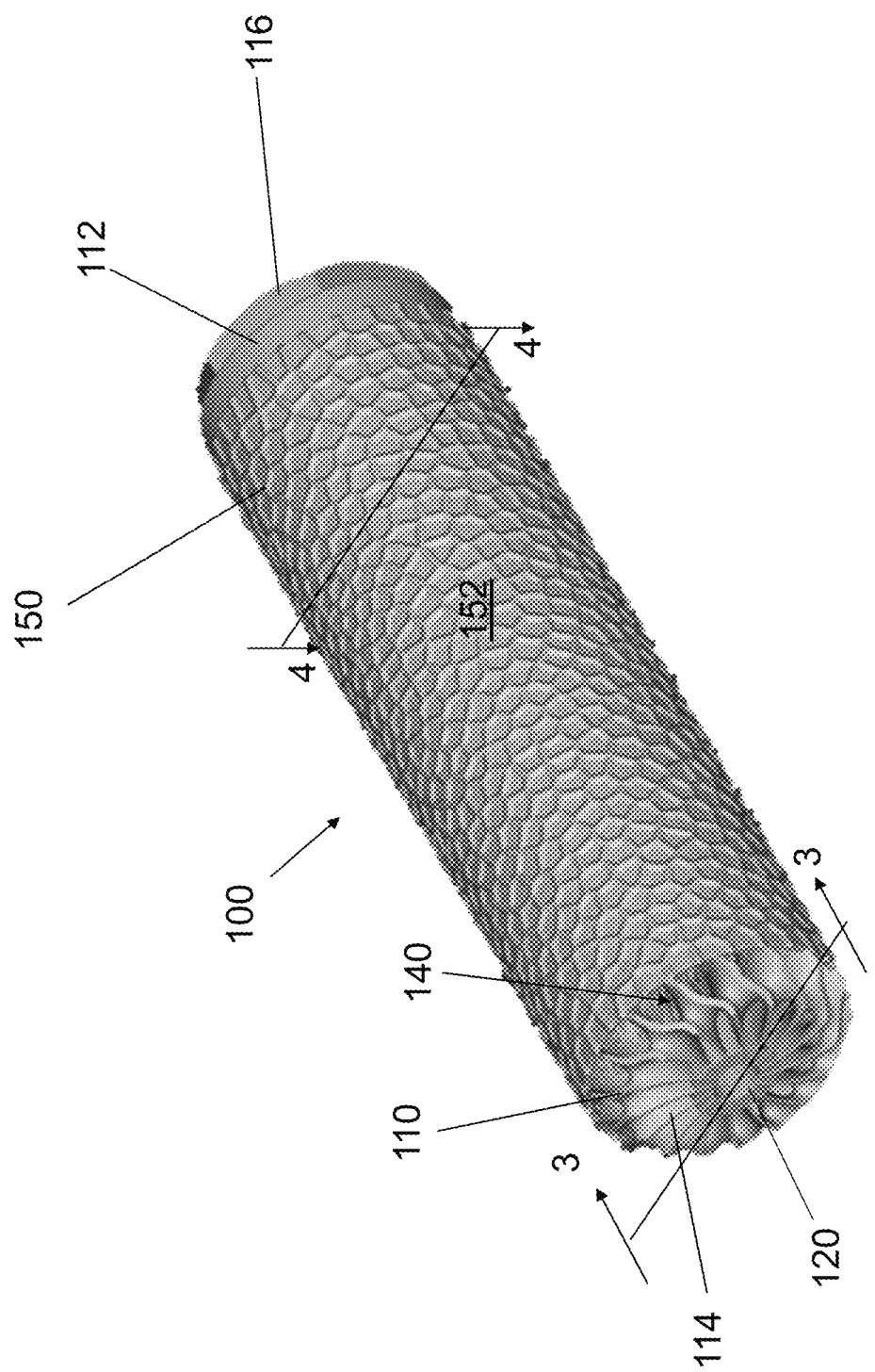
FIG. 1 shows a perspective view of a muzzle device according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Various muzzle devices may be mounted on the end of a firearm barrel for providing different results. Some muzzle devices may reduce a flash produced when firing the firearm, reduce a volume of the sound produced when firing a firearm, compensate for firearm recoil, or a combination thereof. Such muzzle devices generally have different constructions for achieving a desired result, and therefore the design for one type of muzzle device may not be suitable for use in other muzzle devices configured to provide a different result.

Specifically, flash hiders may include a tubular structure with sidewall openings to vent gases produced when the firearm is fired. Flash hiders may be produced by machining openings into a solid tubular structure. This process can be time consuming and cumbersome. Flash hiders having complex geometries, such as internal channels and narrow or curved constrictions generally cannot be made by drilling, machining, and other subtractive manufacturing methods, or such geometries may be produced only with extreme difficulty. Similarly, muzzle devices that compensate for recoil may be produced with openings only on a portion of a sidewall of a tubular structure so that gases are vented in a specific direction to counteract the firearm recoil.

Muzzle devices used to reduce or suppress the noise produced when firing a firearm generally have a considerably different construction than a flash hider as described above. For example, a noise suppressor may have a generally tubular structure with a plurality of internal baffles extending toward a central bore and no sidewall openings. As a result, designs for flash hiders generally are not suitable for suppressing noise produced by the firearm and vice versa. Thus, a muzzle device construction that may be useful in a flash hider or in a noise suppressor is desired to simplify manufacturing of different muzzle devices.

Some embodiments described herein relate to muzzle devices manufactured by an additive manufacturing method to provide a muzzle device having a body with a lattice structure defining a network of interconnected channels for cooling and venting gases produced when the firearm is fired. Additive manufacturing allows the body of the muzzle device to be made with a complex geometry, such as a body having a lattice structure defining a network of interconnected channels through which the gases produced by the firearm may flow. Some embodiments described herein relate to muzzle devices that have a body with a lattice of triply periodic minimal surfaces. The triply periodic minimal surfaces allow for the body to have a high surface area for contacting and cooling gases produced by the firearm while also maintaining the structural strength and stability of the muzzle device. Further, the design may be suitable for use in both flash hiders and noise suppressors with little modification.

Some embodiments described herein relate to a muzzle device 100, as shown in FIG. 1. Muzzle device 100 may be configured to reduce flash and/or to suppress or reduce a noise produced when firing a firearm. Muzzle device 100 may have a body 110 with a first end 112 opposite a second end 114. Body 110 may define a central bore 120 extending from first end 112 to second end 114 along a longitudinal axis of body 110, such that body 110 has a tubular structure. In some embodiments, a transverse cross sectional area of body 110 may be circular. In such embodiments, body 110 may have a generally cylindrical shape.

First end 112 of body 110 may include a connector 116 configured to be removably secured to an end of a firearm barrel. Bore 120 of body 110 can be aligned with the barrel of a firearm so that a projectile may travel through the barrel and through bore 120 of muzzle device 100. In some embodiments, muzzle device 100 may be secured to the barrel of the firearm via a threaded connection. Specifically, connector 116 of muzzle device 100 may include internal threading configured to engage with external threading on the end of the barrel of the firearm to provide a simple and secure connection. However, connector 116 may be secured to barrel of firearm via other fastening methods, such as via a bayonet connection, among others.

Figure 2:
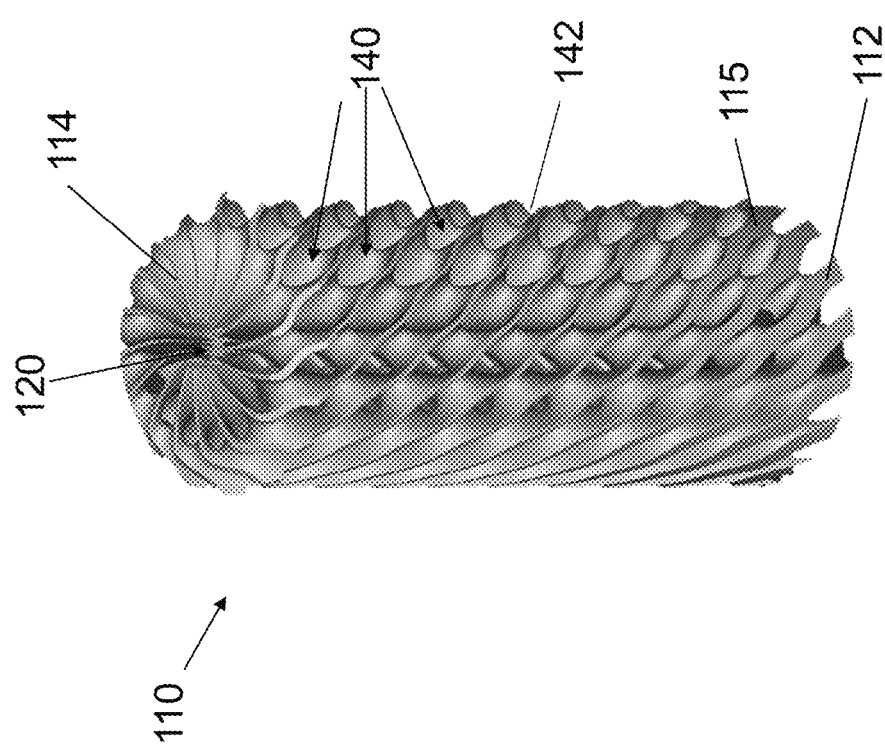
FIG. 2 shows a perspective view of a body of the muzzle device of FIG. 1.
Figure 3:
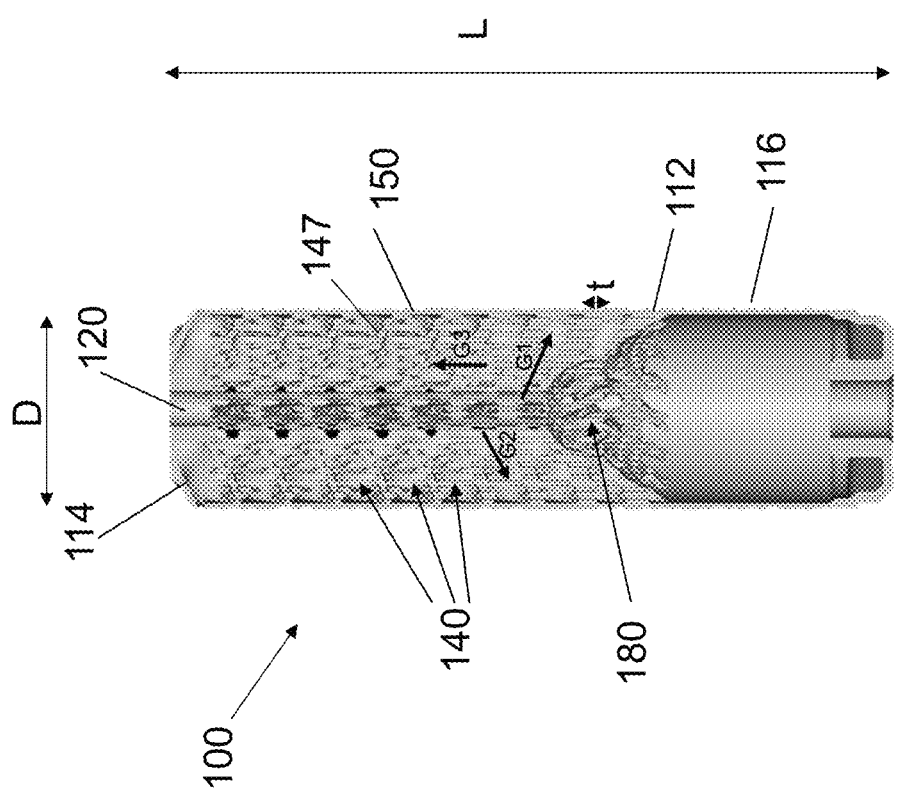
FIG. 3 shows a longitudinal cross sectional view of the muzzle device of FIG. 1 as taken along line 3-3 in FIG. 1.

Body 110 of muzzle device 100 may include a lattice structure defining a network of interconnected channels 140 extending through all or portions of body 110 from bore 120 to openings 142 on body 110, as shown in FIG. 2. Channels 140 may be arranged in a regular or repeating pattern on body 110. In some embodiments, channels 140 may be non-linear and may have a curvature. In some embodiments, one or more channels 140 may extend in a longitudinal direction, in a radial direction, in a circumferential direction, or a combination thereof. Thus, gases may flow from bore 120 into the network of channels 140, as best shown in FIG. 3. Gases may flow in various directions including in generally radial directions G1 and G2 from bore 120 toward an outer shell 150 surrounding body 110, or may flow in a generally longitudinal direction G3 toward second end 114 of body 110. Due to the number of channels 140 and interconnectivity of channels 140, gases may flow randomly or chaotically through channels 140 facilitating cooling of the gases and reduction of energy. Further, as the gases may flow in various patterns through body 110, gases may travel a relatively large distance within body 110 before escaping muzzle device 100.

In embodiments in which muzzle device 100 is a flash hider, gases may be dispersed from body 110 via openings on a sidewall of the muzzle device, as discussed in further detail below. However, in embodiments in which muzzle device 100 is a noise suppressor, as shown in FIG. 1, an outer shell 150 may be arranged around body 110 so that gases may not escape from sidewall of muzzle device 100. Outer shell 150 may have a tubular structure and may surround body 110 of muzzle device 100 so as to cover openings 142 of body 110. Specifically, outer shell 150 may be arranged around a sidewall of body 110. Outer shell 150 may be a solid wall with no openings so that muzzle gases may not escape muzzle device 100 via a sidewall of muzzle device 100. Instead, gases may be funneled toward second end 114 of muzzle device 100. In this way, the network of interconnected channels 140 may serve as baffles.

In some embodiments, outer shell 150 may include a surface pattern 152, as shown in FIG. 1, to improve heat transfer from the muzzle gases to muzzle device 100 to cool the muzzle gases. Surface pattern 152 may be, for example, a webbed surface pattern. However, other surface patterns may be used that increase surface roughness of outer shell 150. Surface pattern 152 may increase surface roughness of muzzle device 100, which may increase the ability of outer shell 150 to absorb heat and cool the muzzle gases.

Figure 4:
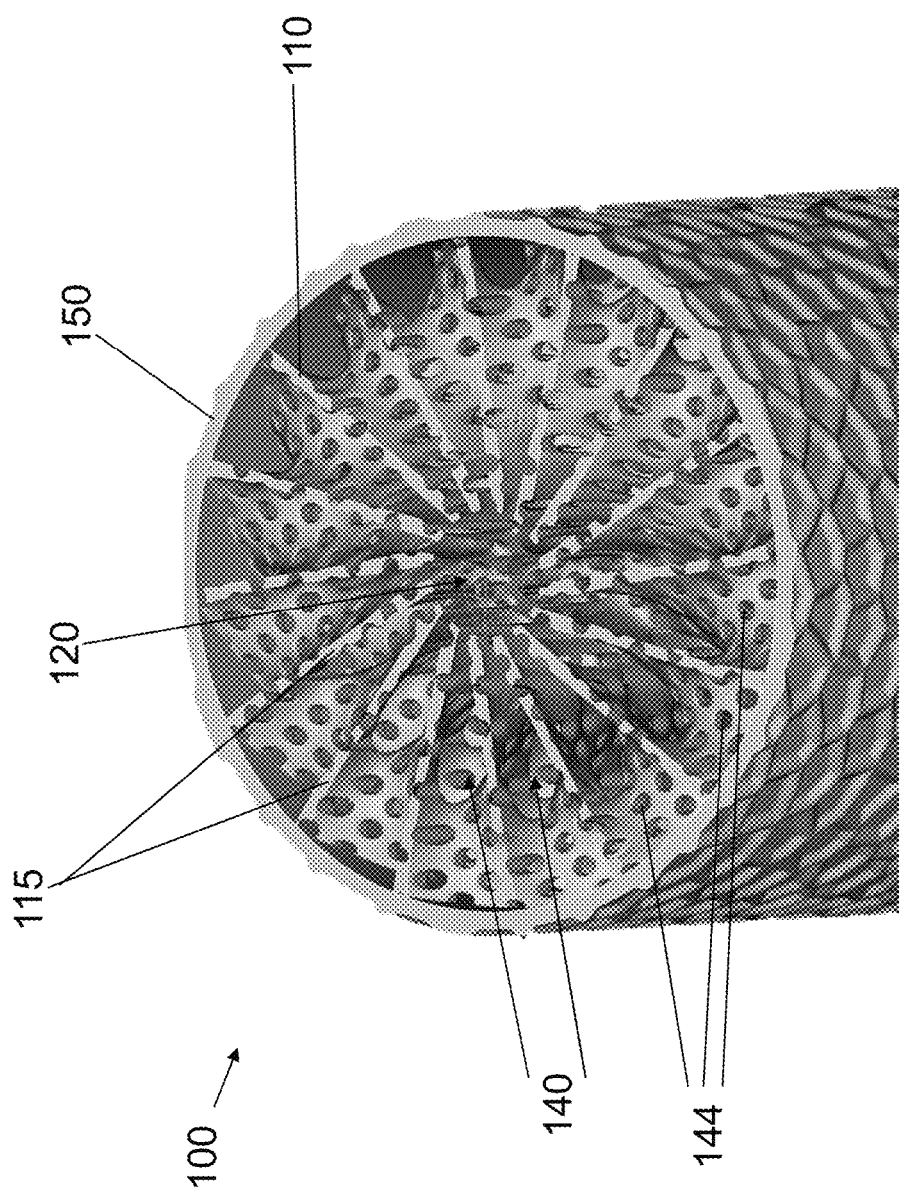
FIG. 4 shows a transverse cross sectional view of the muzzle device of FIG. 1 as taken along line 4-4 in FIG. 1.

In some embodiments, as best shown in FIG. 4, body 110 may include vanes 115 that define channels 140. Vanes 115 may extend generally radially around bore 120. Vanes 115 may also extend helically along longitudinal axis of body 110. Vanes 115 may have a serpentine or undulating configuration (see, e.g., FIG. 2). Body 110, and specifically vanes 115, may be perforated so as to define a plurality of internal openings 144 to further increase flow of the muzzle gases through body 110, increase surface area of body 110, and decrease weight of muzzle device 100.

In some embodiments, body 110 and vanes 115 may decrease in thickness from first end 112 toward second end 114 of body 110 as best shown in FIG. 2. Due to the thickness at first end 112, body 110 may have greater structural stability at first end 112 near the connection to firearm. Similarly, openings 142 may increase in diameter from first end 112 toward second end 114 of body 110 to provide additional space for gas flow.

Channels 140 in body 110 provide body 110 with an increased surface area relative to a body 110 having no channels. The surface area includes the walls or surfaces 147 of body 110 that define the channels 140 within body 110 (see, e.g., FIG. 3). Such surfaces 147 provide body 110 with a high heat transfer surface area to facilitate heat transfer from the gases to body 110. As gases from the firearm flow through channels 140, the energy of the gases dissipates due to the flow restrictions through channels 140 and the gases are cooled by contact with body 110. Body 110 may be made of a material having a high thermal conductivity, such as metal or ceramic. Accordingly, body 110 may absorb heat from the gases, decreasing the temperature of the gases. Thus, increasing the surface area of body 110 of muzzle device 100 increases the ability of body 110 to cool the gases produced by the firearm.

In some embodiments, body 110 of muzzle device 100 may have a total surface area in a range of approximately 7,000 mm$^2$ to approximately 24,000 mm$^2$, such as approximately 7,250 mm$^2$ to approximately 20,000 mm$^2$ or such as approximately 7,500 mm$^2$ to approximately 14,000 mm$^2$. In another aspect, body 110 of muzzle device 100 may have a total surface area greater than approximately 5,000 mm$^2$. In such embodiments, muzzle device 100 may have a total length of 2 inches to 5 inches and a maximum diameter of 0.5 inches to 1 inch. In this way, a high total surface area is provided while retaining a compact muzzle device. Length L may be measured from first end to second end of body 110 in a longitudinal direction, and the maximum diameter D measured in a transverse direction, as shown in FIG. 3. The surface area of body 110 may increase as the length L or diameter D of body 110 increases. However, muzzle device 100 may become cumbersome as the length or diameter of the muzzle device increases, and increasing the overall dimensions of muzzle device 100 may result in a corresponding increase in weight. Generally, it is desired to minimize the weight of muzzle device 100. As muzzle device 100 is mounted at the end of the barrel of the firearm, increasing the weight at the end of the barrel may negatively impact the weight distribution of the firearm. Having excess weight at an end of the barrel may make it more difficult for the user to hold the firearm steady and maintain proper aim. By forming muzzle device 100 with channels 140, muzzle device 100 may have increased surface area for heat transfer relative to a muzzle device 100 of the same length and diameter that lacks channels. Further, by including channels 140 in muzzle device 100, the weight of the muzzle device may be reduced relative to a muzzle device of the same material and length and diameter without the channels. Thus, it is desirable to design a muzzle device to increase the surface area muzzle device without increasing the length and/or diameter of the muzzle device.

While including channels 140 in body 110 may increase surface area of body 110 and the ability to cool gases expelled from firearm, increasing the amount or size of channels 140 in body 110 may decrease the structural strength and stability of body 110. In some embodiments, thickness t of body 110 (see, e.g., FIG. 3) may be a minimum of approximately 0.7 mm or a minimum of approximately 1 mm, depending on the material used to construct body 110 in order to retain sufficient structural strength and stability. However, by forming body 110 to include a lattice of triply periodic minimal surface (TPMS), structural stability and strength may be maintained while providing a body 110 having a high surface area and reduced weight relative to a muzzle device of the same material and dimensions without an interconnected network of channels and/or TPMS.

In some embodiments, body 110 of muzzle device 100 may include a triply periodic minimal surface (TPMS). Body 110 may include repeating pattern or lattice of triply periodic minimal surfaces. The TPMS provides body 110 with structural strength and stability to withstand forces exerted on muzzle device 100 from repeated firing of a firearm, while also providing a body 110 with an interconnected network of channels 140 through which gases from the firearm may be vented. The TPMS structure may provide a periodic or repeating pattern of nonlinear surfaces. Further, the TPMS structure may provide symmetry along one or more axes.

In some embodiments, the triply periodic minimal surface may be a Gyroid, as shown in FIG. 1. In some embodiments, however, the TPMS may be a Schwarz P, Diamond, Neovius, IWP, Schwarz D, PW hybrid, Holes, Icosahedron, L, or Schwarz G, as will be understood by one of ordinary skill in the art.

In some embodiments, the TPMS surface may be defined by the following equations:

Gyroid may be defined by the equation:

$$\cos(x)*\sin(y)+\cos(y)*\sin(z)+\cos(z)*\sin(x)=0$$

Schwarz P may be defined by the equation:

$$-(\cos(x)+\cos(y)+\cos(z))=0$$

Diamond may be defined by the equation:

$$\sin(x)*\sin(y)*\sin(z)+\sin(x)*\cos(y)*\cos(z)+\cos(x)*\sin(y)*\cos(z)+\cos(x)*\cos(y)*\sin(z)=0$$

Neovius may be defined by the equation:

$$3*\cos(x)+\cos(y)+\cos(z)+4\cos(x)*\cos(y)*\cos(x)=0$$

IWP may be defined by the equation:

$$(\cos(x)*\cos(y)+\cos(y)*\cos(z))+(\cos(z)*\cos(x)-\cos(x)*\cos(y)*\cos(z))=0$$

Schwarz D may be defined by the equation:

$$\cos(x)*\cos(y)*\cos(z)-\sin(x)*\sin(y)*\sin(z)=0$$

Holes may be defined by the equation:

$$(\cos(x)+\cos(y)+\cos(z))+4(\cos(x)*\cos(y)*\cos(z))=0$$

Schwarz G may be defined by the equation:

$$\sin(x)*\cos(y)+\sin(z)*\cos(x)+\sin(y)*\cos(z)=0$$

In some embodiments, muzzle device may be configured to reduce the flash provided by a firearm. Such muzzle devices may have the same features and construction as described above with respect to muzzle device 100, but do not include an outer shell 150 so that muzzle gases may escape body through openings of the interconnected network of channels as described in further detail below.

Figure 5:
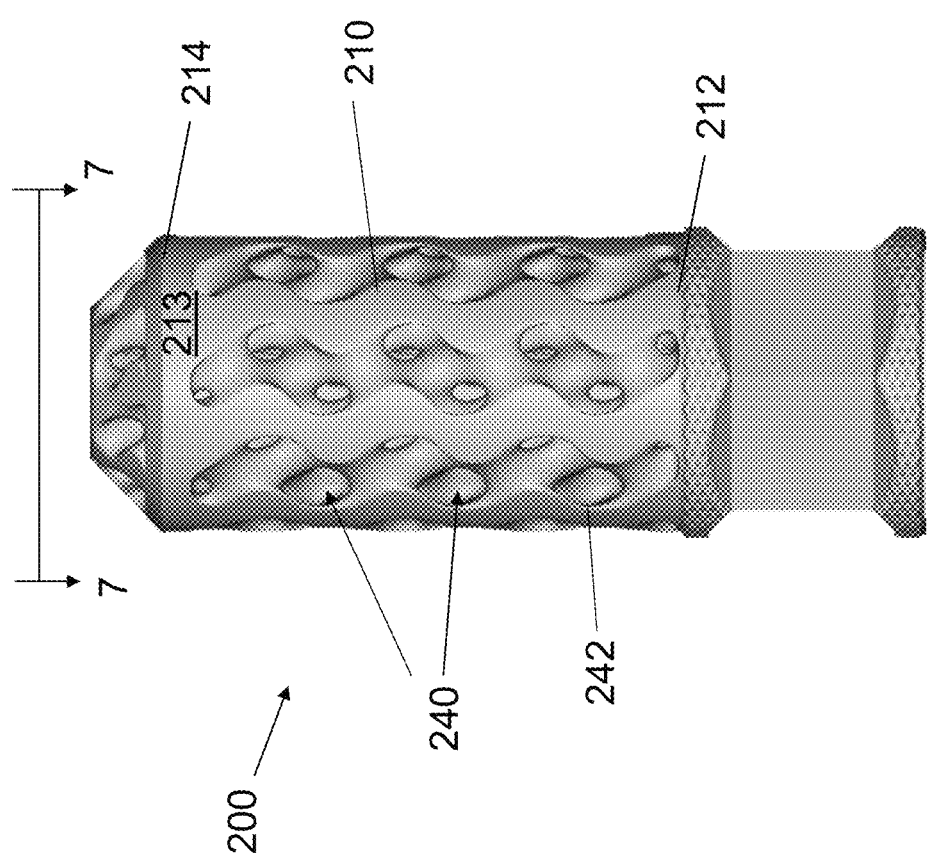
FIG. 5 shows a perspective view of a muzzle device according to an embodiment.
Figure 6:
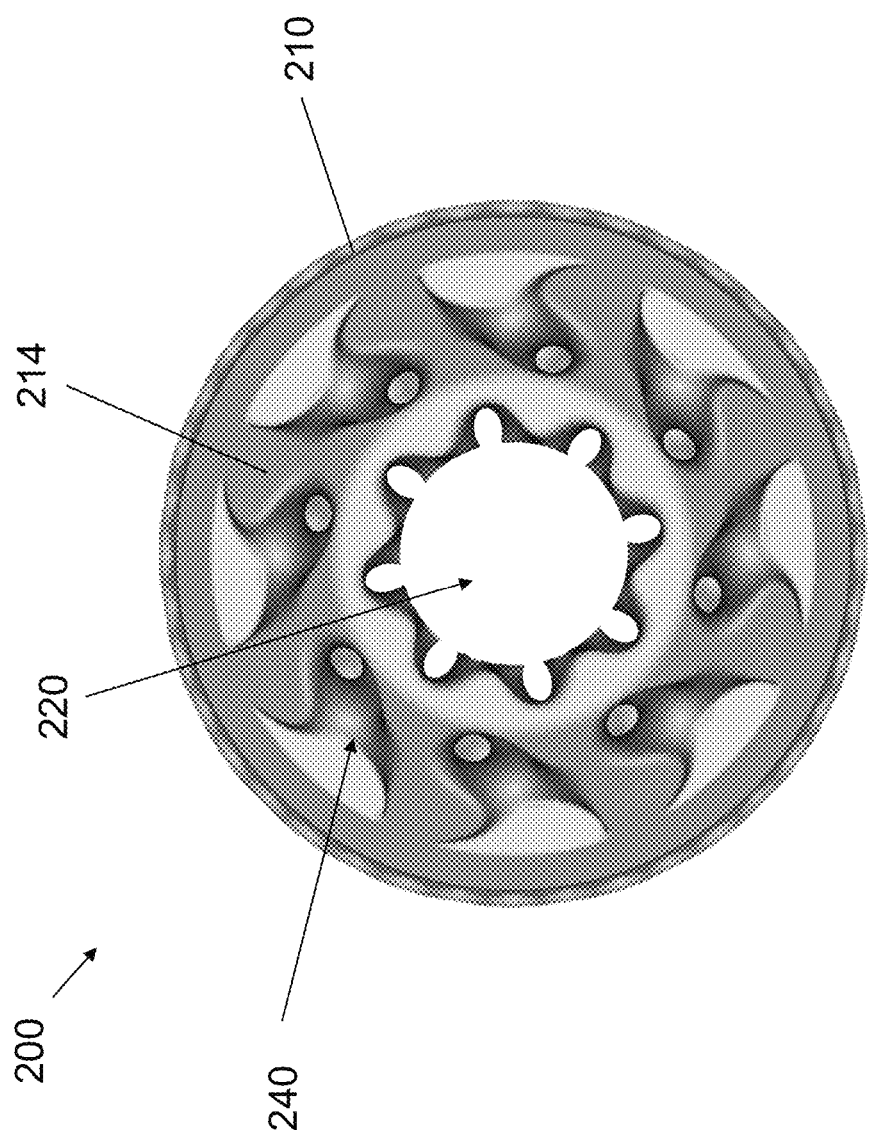
FIG. 6 shows an end view of the muzzle device of FIG. 5.
Figure 7:
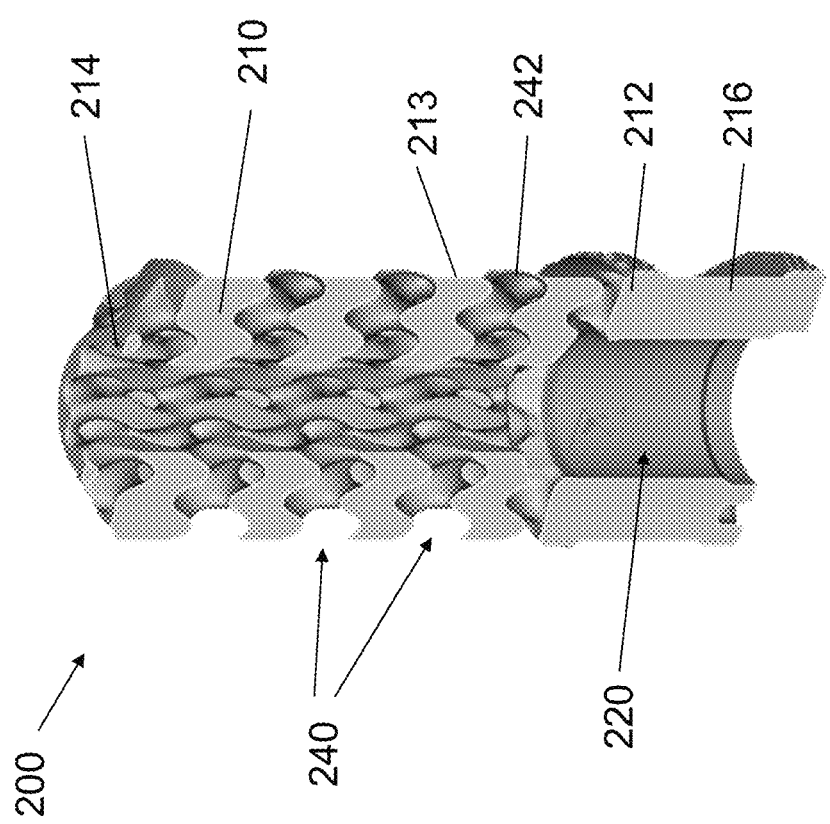
FIG. 7 shows a longitudinal cross sectional view of the muzzle device of FIG. 5 as taken along line 7-7 in FIG. 5.

In some embodiments, muzzle device 200 may be configured to reduce flash as shown in FIGS. 5 to 7. Body 210 of muzzle device 200 may have similar features and construction as described with respect to body 110 of muzzle device 100. Similar to body 110 of muzzle device 100, body 210 includes a first end 212 opposite a second end 214. Muzzle device 200 may define a central bore 220 extending from first end 212 to second end 214. Body 210 may have a tubular structure and may have a circular transverse cross sectional area. First end 212 includes a connector 216 for securing muzzle device 200 to an end of a firearm barrel. Further, body 210 may include a lattice structure defining a plurality of interconnected channels 240 that extend through body 210 from bore 220 to exterior surface 213 of body 210. Body 210 may include a triply periodic minimal surface, and may have a repeating pattern or lattice of TPMS, as described above. However, muzzle device 200 differs from muzzle device 100 in that muzzle device 200 includes a different TPMS structure. Specifically, muzzle device 200 includes a Gyroid structure of different dimensions or parameters. Further, muzzle device 200 configured as a flash hider does not include an outer shell 150. Instead, channels 240 of muzzle device 200 terminate at openings 242 on exterior surface 213 of body 210 so that gases may escape muzzle device 200 through openings 242 of exterior surface 213.

Channels 240 may extend through body 210 such that gases produced when the firearm is fired may flow through channels 240 from bore 220 to an area exterior to muzzle device 200. In this way, channels 240 disperse the gases produced by the firearm, increasing mixing of the gases with air and resulting in a decrease of flash signature produced by the firearm. Venting the gases through the plurality of channels 240 rather than having all gases expelled from the end of the barrel or bore 220 may serve to reduce the flash signature of the firearm. In some embodiments, channels 240 may be configured to disperse the gases approximately 360 degrees around body 210.

Figure 8:
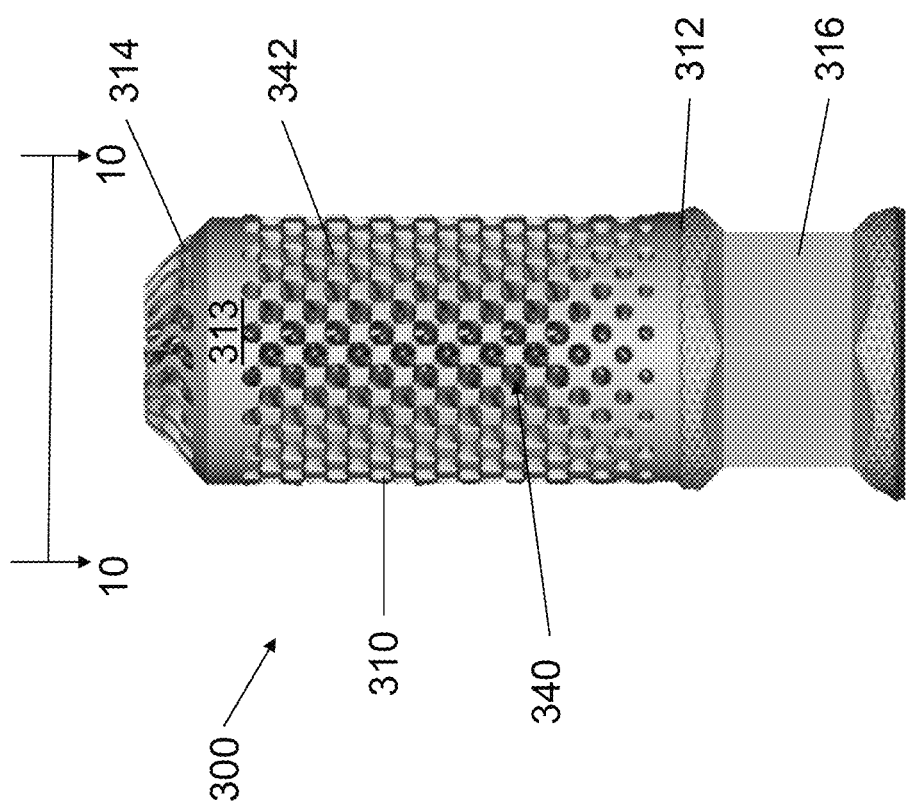
FIG. 8 shows a side perspective view of a muzzle device according to an embodiment.
Figure 9:
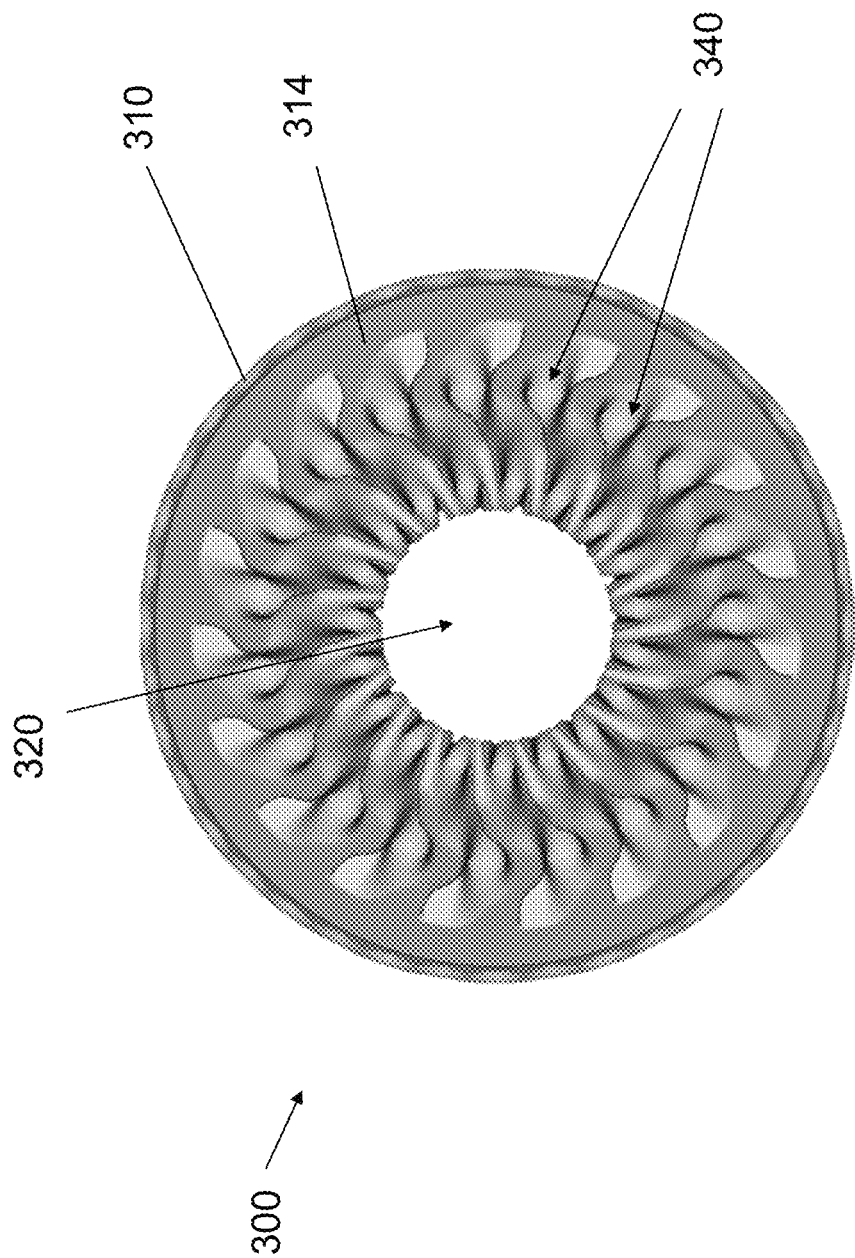
FIG. 9 shows an end view of the muzzle device of FIG. 8.
Figure 10:
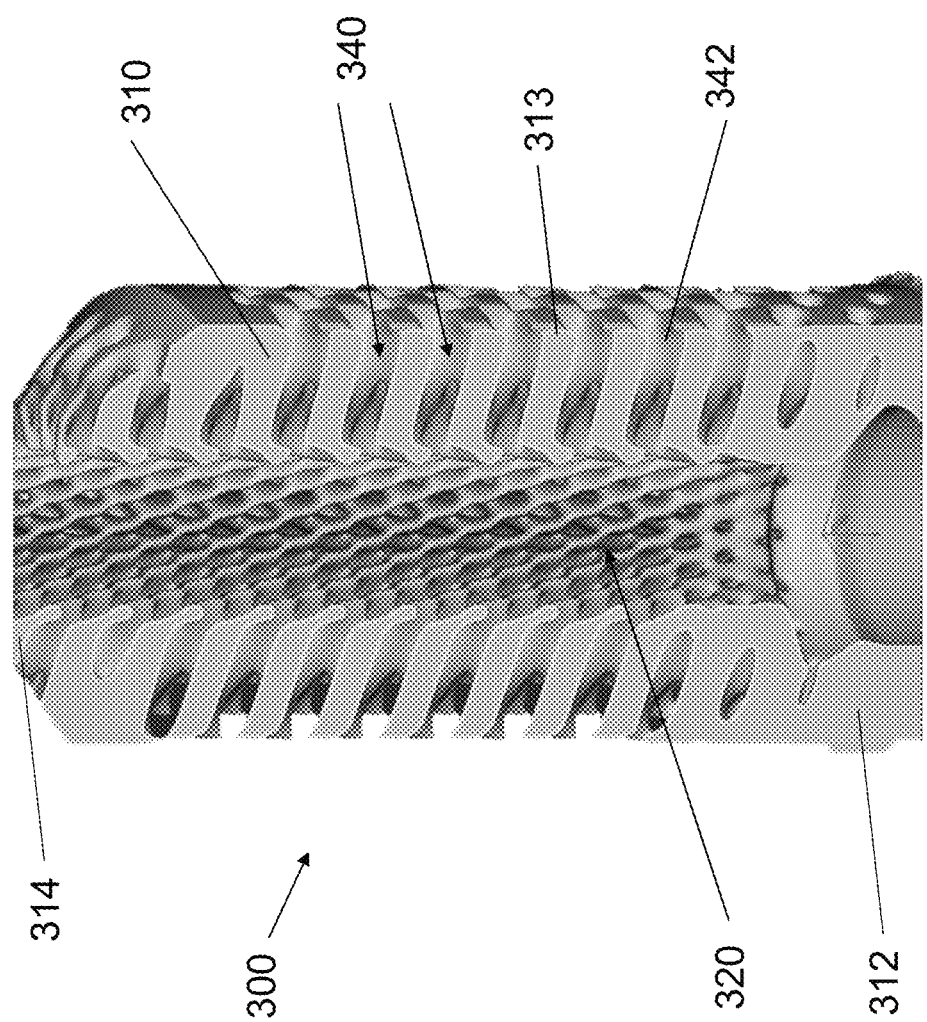
FIG. 10 shows a longitudinal cross sectional view of the muzzle device of FIG. 8 as taken along line 10-10 in FIG. 8.

In some embodiments, muzzle device 300 may be configured to reduce flash as shown in FIGS. 8 to 10. Muzzle device 300 is similar to muzzle device 200 and may have the same features and construction as described above. However, muzzle device 200 includes a different TPMS structure. Specifically, muzzle device 300 may have a Diamond structure. As shown in FIG. 8, body 310 may have openings 342 arranged in a grid pattern or checkered pattern. Further, body 310 of muzzle device 300 may include openings 342 that increase in diameter from first end 312 to second end 314 of body 310. Thus, openings 342 adjacent second end 314 of body 310 may have a diameter that is greater than openings 342 adjacent first end 312 of body 310.

As best shown in FIG. 10, body 310 may have a lattice structure defining a plurality of interconnected channels 340 into which gases may flow from bore 320. Some channels 340 may be arranged generally radially. Other channels 340 may extend in a direction from first end 312 toward second end 314 of body 310 so that gases may flow within body 310 and between different radial channels. The high degree of interconnectivity allows gases to flow randomly or chaotically as the gases move from bore 320 toward an exterior of muzzle device 300.

Figure 11:
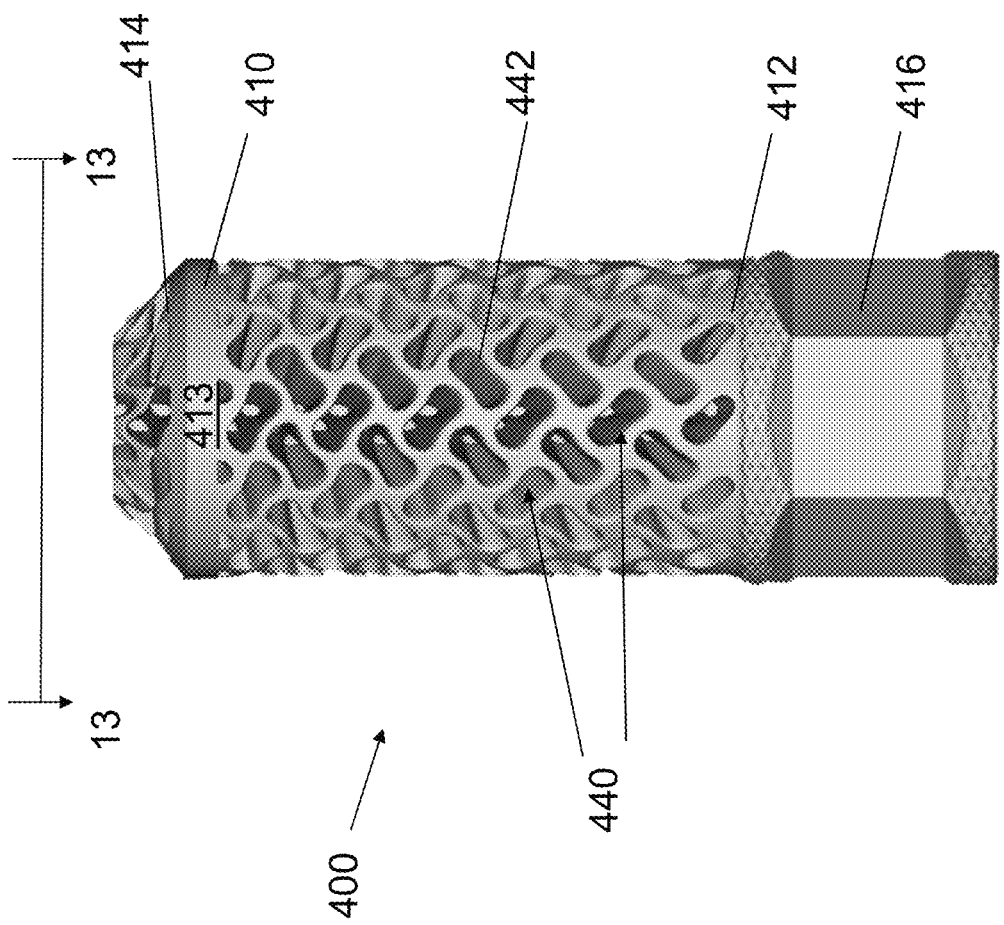
FIG. 11 shows a side perspective view of a muzzle device according to an embodiment.
Figure 12:
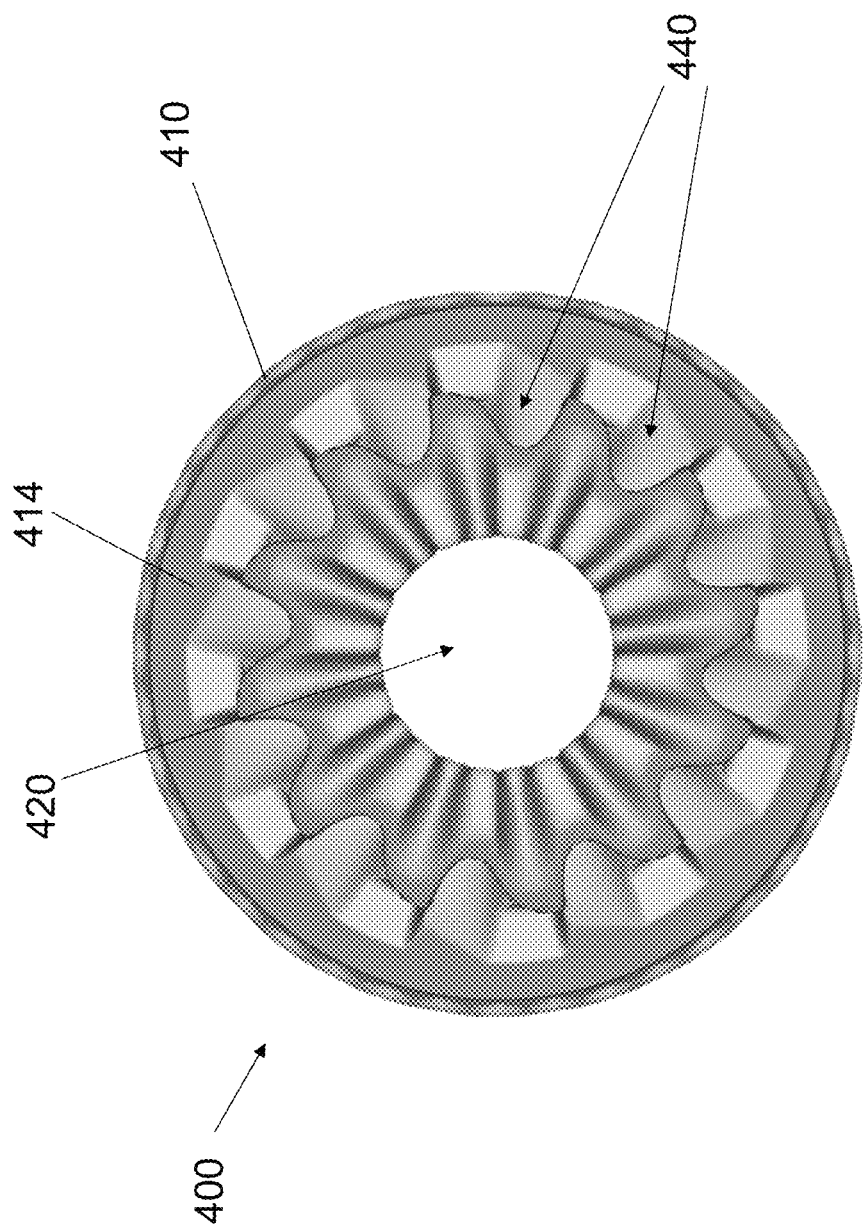
FIG. 12 shows an end view of the muzzle device of FIG. 11.
Figure 13:
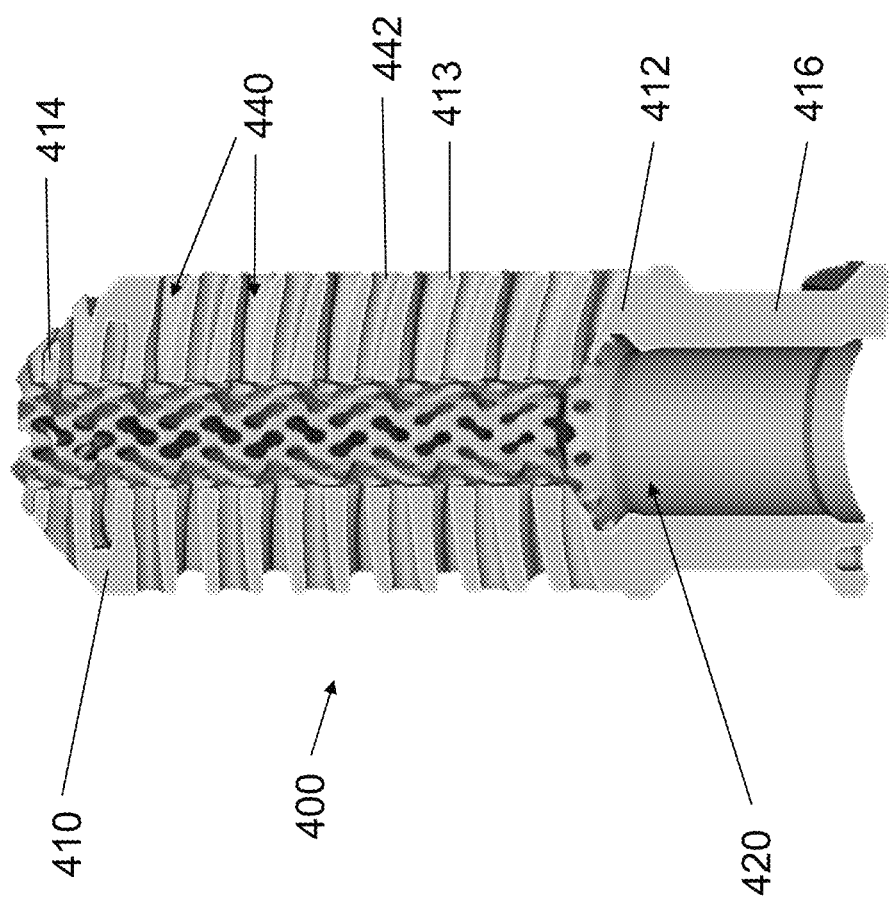
FIG. 13 shows a longitudinal cross sectional view of the muzzle device of FIG. 11 as taken along line 13-13 in FIG. 11.

In some embodiments, muzzle device 400 may be configured to reduce flash as shown in FIGS. 11 to 13. Muzzle device 400 is similar to muzzle devices 200, 300 and may have the same features and construction as described above. However, muzzle device 400 includes a different TPMS structure. Specifically, muzzle device 400 may have a Gyroid structure of different dimensions. As shown in FIG. 11, body 410 may include a lattice structure defining an interconnected network of channels 440 having openings 442 on an exterior surface 413. Some channels 440 may extend generally radially as shown in FIG. 13. Further, body 410 of muzzle device 400 may include openings 442 that increase in diameter from first end 412 to second end 414 of body 410. Openings 442 adjacent second end 414 of body 410 may have a diameter that is greater than openings 442 adjacent first end 412 of body 410.

In any of the embodiments described herein, a muzzle device may have a length L as measured in a longitudinal direction from first end to second end in a range of approximately 2 inches to approximately 15 inches (see, e.g., FIG. 3). Muzzle device may have a diameter D measured in a transverse direction of approximately 0.5 inches to approximately 2.5 inches. In one embodiment, for example, a muzzle device may have a diameter of 0.75 inches and a length of 4 inches. The specific dimensions may depend upon the type and caliber of firearm, as will be understood by one of ordinary skill in the art.

In any of the embodiments described herein, when muzzle device is composed of titanium, muzzle device may have a total weight in a range of approximately 5 oz to approximately 10 oz, such as approximately 6 oz to approximately 9.5 oz, such as approximately 7 oz to approximately 9 oz. A muzzle device composed of stainless steel may have a total weight in a range of approximately 13 oz to approximately 25 oz, such as approximately 14 oz to approximately 23 oz, such as approximately 15 oz to approximately 22 oz.

In some embodiments, a body of muzzle device may have a high ratio of surface area to weight. In some embodiments, a stainless steel body may have a surface area to weight ratio of approximately 4,500 mm$^2$/oz to approximately 8,000 mm$^2$/oz. In some embodiments, a body of the muzzle device may have a high ratio of surface area to length or of surface area to volume.

The muzzle devices described herein may help to reduce the energy of the muzzle gases and cool the gases to reduce flash or suppress noise by providing a high surface area for heat transfer, an interconnected network of channels that allows for random dispersion of gases through the muzzle device, and a high surface roughness to further increase contact of the gases with the body.

Figure 14:
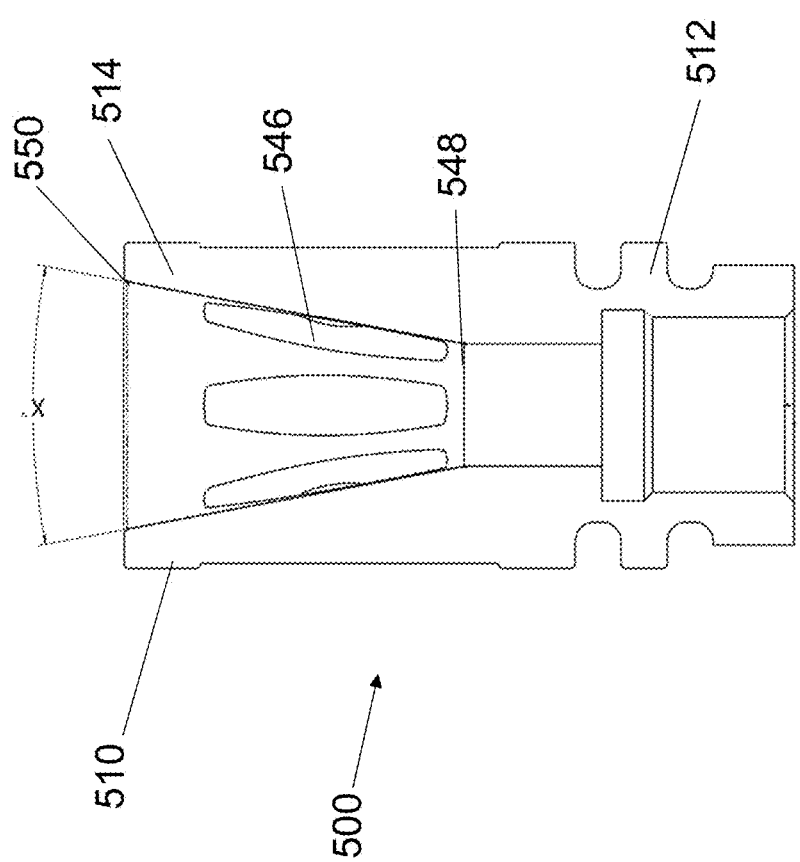
FIG. 14 shows a cross sectional view of a muzzle device according to an embodiment.

In some embodiments, a muzzle device 500 may be configured to promote the dispersion of a gas flow field as it is ejected from muzzle device 500, as shown for example in FIG. 14. Muzzle device 500 is similar to muzzle devices 200, 300, and 400 and may have the same features and construction as described above. While bore of muzzle devices 200, 300, 400 is shown as having a substantially constant diameter, bore 520 of muzzle device 500 may have a varying diameter, such that a diameter of bore 520 at or adjacent a first end 512 of body 510 differs from a diameter of bore 520 at or adjacent second end 514 of body 510. In some embodiments, bore of muzzle device 500 includes an internal conical taper 546 extending from a portion adjacent a first end 512 to a portion adjacent a second end 514 of muzzle device 500 along a longitudinal axis of muzzle device 500. Conical taper 546 functions as a Venturi, with its smallest diameter 548 located closest to first end 512, and its largest diameter 550 at its outflow end at second end 512. Largest diameter 550, at second end 512, opens in the direction of travel of the gasses. The angle of conical taper 546 may be selected based on the velocity and/or expansion rate of the gasses ejected. Smallest diameter 548 of conical taper 546 may be larger than the groove diameter of the rifling profile to ensure that the projectile is not impeded by muzzle device 500 and/or any potential build-up of carbon or other fouling.

Any of the muzzle devices described herein may be formed by an additive manufacturing method. The use of additive manufacturing allows for muzzle device to be integrally formed as one unitary piece. Further, additive manufacturing allows for muzzle device to be formed with complex geometries, such as internal channels and narrow or curved constrictions. The muzzle device may be additively manufactured such that no support structures are required to support the muzzle device during the additive manufacturing process. As a result, additional post-processing steps to remove support structures after additive manufacturing is completed are not required. Additive manufacturing processes suitable for manufacturing the muzzle device include but are not limited to, selective laser melting (SLM), direct metal laser sintering (DMLS), or electron beam melting (EBM), among others. The muzzle device may be formed using a metal powder. In some embodiments, the metal powder may have an average diameter in a range of 0.5 μm to 5 μm.

Additive manufacturing processes permit the manufacture of complex structures and geometries, which may otherwise be difficult or impossible to produce with conventional "subtractive" manufacturing processes. This additive manufacturing capability, when used in conjunction with finite element analysis, fluid simulation, and virtual testing, may be employed to optimize the geometry and topology of a muzzle device, resulting in a reduction in mass, as well as the ability to control and/or vector gas flow to suit a specific application. These applications may include the efficient dispersion of gasses to reduce or eliminate post-ignition, vectoring of gasses to reduce muzzle signature or ground-effect, and/or vectoring gasses for the purposes of countering linear or rotational recoil.

Muzzle device may be additively manufactured from a metal, such as stainless steel, Inconel, titanium, a ceramic material, or a combination thereof, among others. The material selected may depend in part on the type or caliber of the firearm to be used with the muzzle device. In some embodiments, a first portion of the muzzle device may be formed from a first material, and a second portion of the muzzle device may be formed from a second material. In some embodiments, the outer shell may be composed of a first material, and the body may be formed of a second material. For example, the body may be formed of stainless steel and the outer shell may be formed of titanium. Stainless steel may be particularly useful for muzzle devices configured for use on firearms having high pressure rounds. In such embodiments in which the muzzle device includes two or more materials, the separate parts may be manufactured separately and secured together, such as by pressing or cladding.

In an exemplary embodiment of an additive manufacturing process, a computerized model of the muzzle device may be generated that divides the muzzle device into a series of vertically stacked layers. A first layer of powder is deposited on a build platform. An energy source, such as a laser or electron beam, may be used to fuse or sinter the powder in the layer based on a first layer of the computerized model. A second layer of powder may then be deposited over the first layer, and the second layer is fused to form a second layer of the muzzle device based on the computerized model. The process of depositing and fusing layers of the powder is repeated until all layers of the computerized model of the muzzle device have been formed.

In some embodiments, the muzzle device may be printed with the layers arranged along a longitudinal axis of the muzzle device, such that layers are formed from the first end toward the second end of the muzzle device, or from the second end toward the first end. In some embodiments, a muzzle device may be formed with a dome structure 180 to facilitate additive manufacturing without support structures, as shown for example in FIG. 3.

In some embodiments, muzzle device may be additively manufactured so as to have a high surface roughness on the body of the muzzle device, and particularly on the walls defining the internal channels. Increasing the surface roughness may further increase the surface area of the body of muzzle device. In some embodiments, a surface of the body may include a surface pattern to increase the surface roughness. The surface roughness of the muzzle device may also be adjusted by modifying the thickness of each layer deposited during additive manufacturing. As the thickness of the layer increases, the surface roughness of the muzzle device also increases. In some embodiments, a thickness of the layers fused in additive manufacturing can be in a range of approximately 20 µm to approximately 80 µm.

In embodiments of the muzzle device having an outer shell, the outer shell may be produced with a lower surface roughness than the body of the muzzle device. In this way, the muzzle device may have a smooth outer surface so that the muzzle device has an aesthetically pleasing appearance for consumers, while providing a relatively rough interior surface. For example, in some embodiments, the thickness of each layer of the outer shell may be a first thickness, and the thickness of each layer of the body may be a second thickness, wherein the second thickness is greater than the first thickness. In this way, the body of the muzzle device is produced with a larger layer thickness and correspondingly higher surface roughness than the outer shell. For example, the outer shell may have a layer thickness of 40 µm, whereas the body may be printed with a layer thickness of 80 µm, such that two layers of the outer shell are formed for every one layer of the body. During additive manufacturing, this variable surface roughness can be achieved by printing the internal structures with every other layer. For example, the outer shell can be printed at each 40 µm layer while the inner components can be printed at every other 40 µm layer, or at 80 µm.

In some embodiments, muzzle device may have a high surface roughness. In some embodiments, a surface roughness Ra of a body of a muzzle device may be in a range of 4 µm to 12 µm. However, it is understood that surface roughness may depend in part on the material used to manufacture the muzzle device.

Once the muzzle device is additively manufactured, one or more finishing processes may be performed. For example, the additively manufactured muzzle device may be sandblasted to evenly abrade the surface of the muzzle device and remove reflective surfaces. In another example, the additively manufactured muzzle device may be heat treated to reduce internal stresses, increase density and develop the final shape of the muzzle device.

Figure 15:
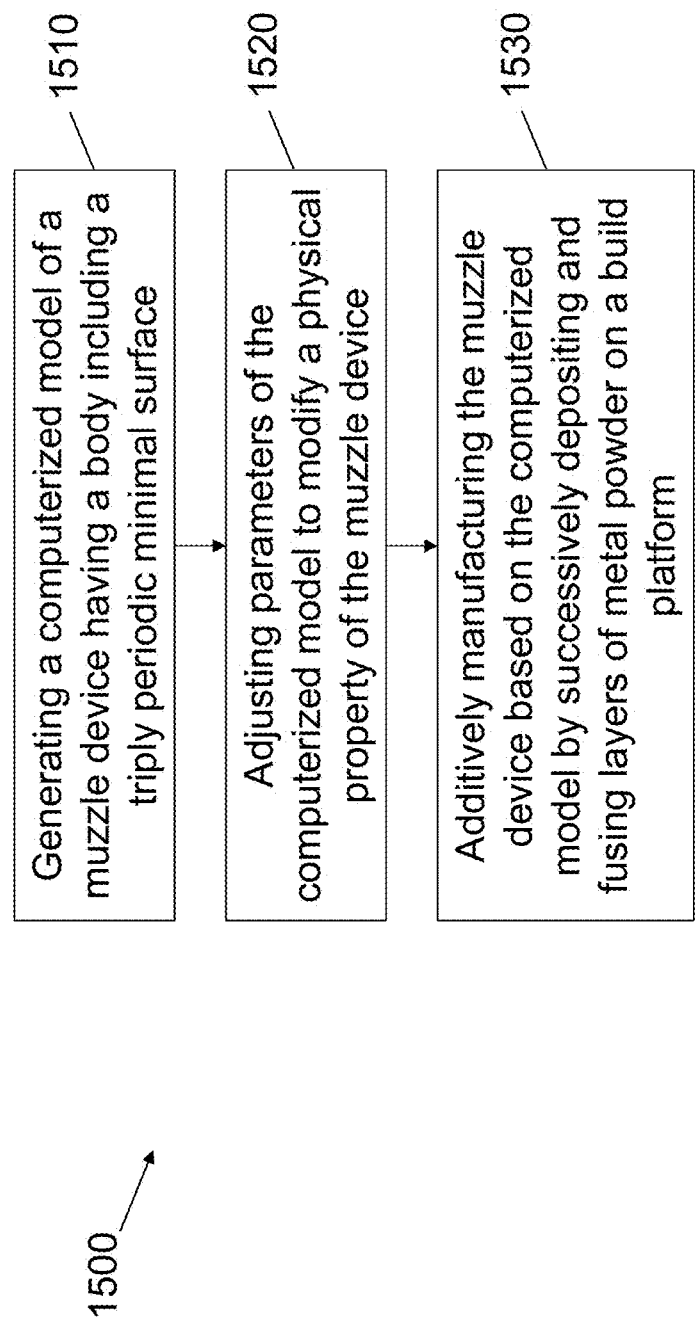
FIG. 15 shows an exemplary method of manufacturing a muzzle device according to an embodiment.

An exemplary method of designing a muzzle device for a firearm according to an embodiment is shown in FIG. 15. The method 1500 may include generating a computerized model of a muzzle device having a tubular body having a triply periodic minimal surface 1510. The body may have a tubular structure with a lattice or repeating pattern of TPMS. The TPMS may be based on an equation as described herein. Parameters of the computerized model may be adjusted to provide the muzzle device the desired physical properties 1520, such as surface area, surface roughness, and weight. Parameters that can be adjusted to modify the physical properties may include type of TPMS, the frequency or repetition of the TPMS, the dimensions of each TPMS surface or unit, the dimensions of the channels, and/or the degree of interconnectivity of the channels, among others. The muzzle device may be additively manufactured based on the computerized model by successively depositing and fusing layers of a metal powder on a build platform 1530. Optionally, one of more finishing processes may be performed on the additively manufactured muzzle device.

The present invention is further described and illustrated by the following non-limiting, experimental examples in which muzzles devices were tested to evaluate the muzzle flash produced by a firearm having a muzzle device as described herein.

Example 1

A number of muzzle devices were tested to evaluate performance. Results obtained using a control device (e.g., a firearm without a muzzle device) and ten muzzle devices constructed according to one or more aspects described herein were compiled for this evaluation.

Figure 16:
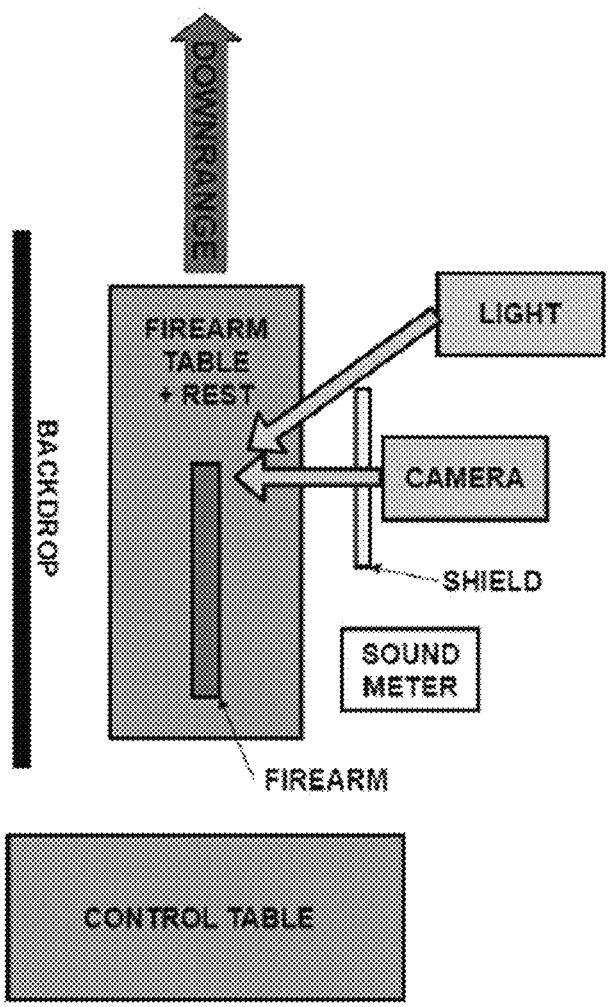
FIG. 16 shows a schematic diagram of the experimental setup for testing muzzle devices according to Example 1.
Figure 17:
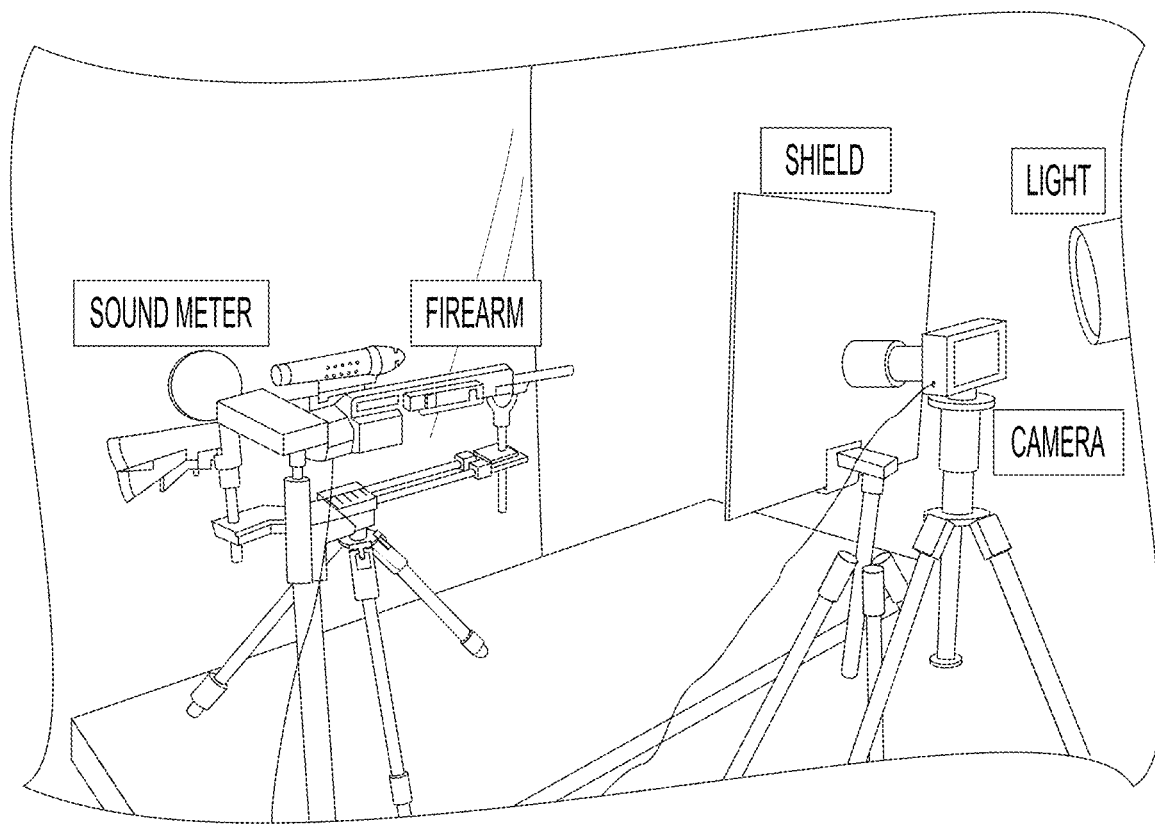
FIG. 17 shows a perspective view of the experimental setup of FIG. 16.

With reference to FIGS. 16-17, the testing equipment for the experimental setup included lighting equipment (e.g., an LED light), a non-reflective backdrop, camera equipment to capture video and images of the flash, camera and lighting tripods, a sound meter, and a firearm rest set to achieve a reasonable height. The equipment was arranged in an enclosed area at an indoor range with ambient humidity, temperature, and wind conditions. The camera equipment was positioned approximately five feet to the side of the test subject with a shield mounted to a tripod directly in front of the camera for protection. The lighting equipment was placed behind one of the cameras to illuminate the firearm when necessary.

A common firearm and ammunition set were used to test each muzzle device. The firearm was a 5.56×45 mm NATO, semi-automatic C8IUR with a 16 inch barrel, manufactured by Colt Canada. Ten rounds were fired with each muzzle device, with the first five rounds shot using the setup shown in FIGS. 16-17, and the remaining five rounds shot with the camera equipment positioned approximately to the rear and side of the marksman. Additionally, the lighting equipment was arranged toward the rear and side of the firearm with the shield placed in front of it for protection from ejected casings. Each setup was validated by setting the camera resolution and frame rate, turning on the lighting equipment, setting the light intensity to allow for an appropriate exposure for the camera setting, confirming that the field of view captures the test subject and expected flash size, beginning recording on the camera, firing test shots, reviewing data on the camera, and adjusting the frame rate to appropriately capture muzzle flash if needed (e.g., confirm visibility of flash). A windscreen was installed after initial calibration.

Images derived from the camera testing equipment were used to assess the absence, presence, and approximate size of the muzzle flash for each test subject. Muzzle flash is typically the result of post ignition of unburnt propellant after the projectile has left the barrel. The larger the flash, the more visible the flash, and thus it is desired to produce no flash or a flash with a small maximum diameter. Here, the visible diameter of the firearm used to evaluate each test subject was 0.65 inches. To show the progression of the flash, aggregate series of images were compiled.

As a control or baseline, the firearm was first fired with no muzzle device. The firearm produced a muzzle flash having a generally circular shape and with a diameter of approximately 13.375 inches.

Figure 18:
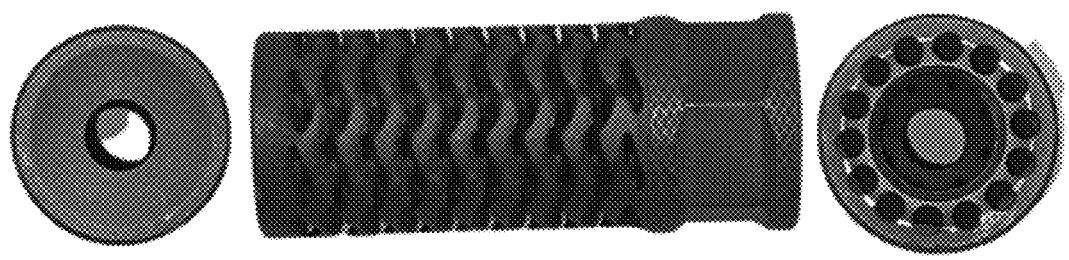
FIG. 18 shows side and end views of Muzzle Device 1 according to one aspect from Example 1.

A muzzle device according to one aspect (Muzzle Device 1) was next installed on the firearm. Muzzle Device 1 is shown in FIG. 18. Muzzle Device 1 includes a length of 2.318 inches, a diameter of 0.9 inches, and a weight of 3.35 oz. The firearm with Muzzle Device 1 produced a muzzle flash having a generally circular shape and with a diameter of approximately 6.17 inches at a distance of approximately 4.5 inches from the muzzle. Thus, the flash of Muzzle Device 1 was 46% of the flash produced by the firearm with no muzzle device.

Figure 19:
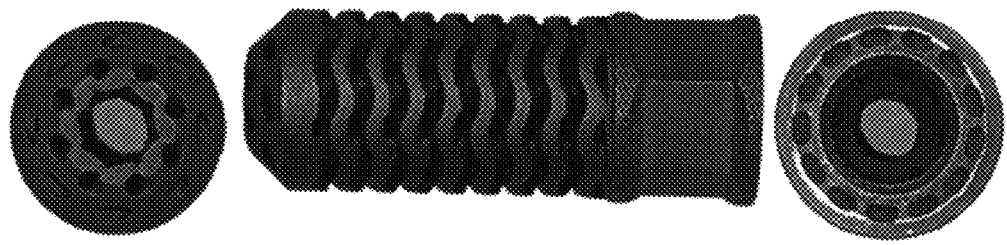
FIG. 19 shows side and end views of Muzzle Device 2 according to one aspect from Example 1.

A muzzle device according to one aspect (Muzzle Device 2) was next installed on the firearm. Muzzle Device 2 is shown in FIG. 19. Muzzle Device 2 includes a length of 2.345 inches, a diameter of 0.845 inches, and a weight of 2.89 oz. The firearm with Muzzle Device 2 produced a muzzle flash having a generally circular shape and with a diameter of approximately 5.1 inches at a distance of approximately 4.45 inches from the muzzle. The flash of Muzzle Device 2 was 38% of the flash with no muzzle device. Thus, Muzzle Device 2 reduced the flash compared to the firearm with no muzzle device, and reduced flash to a greater extent than Muzzle Device 1.

Figure 20:
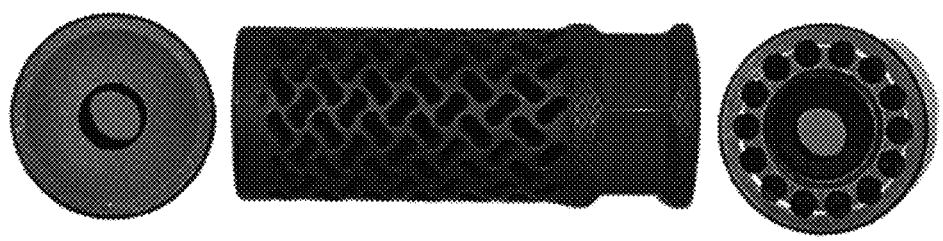
FIG. 20 shows side and end views of Muzzle Device 3 according to one aspect from Example 1.

A muzzle device according to one aspect (Muzzle Device 3) was next installed on the firearm. Muzzle Device 3 is shown in FIG. 20. Muzzle Device 3 includes a length of 2.318 inches, a diameter of 0.896 inches, and a weight of 3.60 oz. The firearm with Muzzle Device 3 produced a muzzle flash having a generally circular shape and with a diameter of approximately 1.625 inches at a distance of approximately 2.3 inches from the muzzle. The flash of Muzzle Device 3 was 12% of the flash with no muzzle device. Thus, Muzzle Device 3 reduced the flash compared to the firearm with no muzzle device, and reduced flash to a greater extent than Muzzle Devices 1 and 2.

Figure 21:
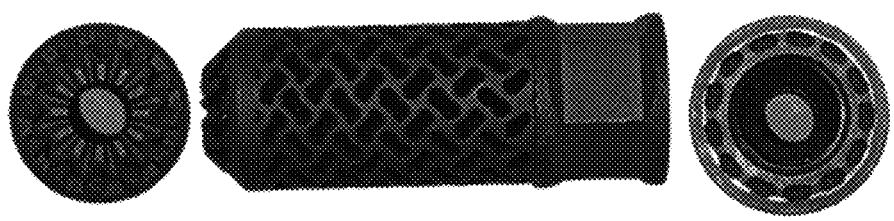
FIG. 21 shows side and end views of Muzzle Device 4 according to one aspect from Example 1.

A muzzle device according to one aspect (Muzzle Device 4) was next installed on the firearm. Muzzle Device 4 is shown in FIG. 21. Muzzle Device 4 includes a length of 2.349 inches, a diameter of 0.890 inches, and a weight of 3.14 oz. The firearm with Muzzle Device 4 produced a muzzle flash having a generally circular shape and with a diameter of approximately 5.3 inches at a distance of approximately 8.6 inches from the muzzle. The flash of Muzzle Device 4 was 40% of the flash with no muzzle device. Thus, Muzzle Device 4 reduced the flash compared to the firearm with no muzzle device, and reduced flash to a greater extent than Muzzle Device 1.

Figure 22:
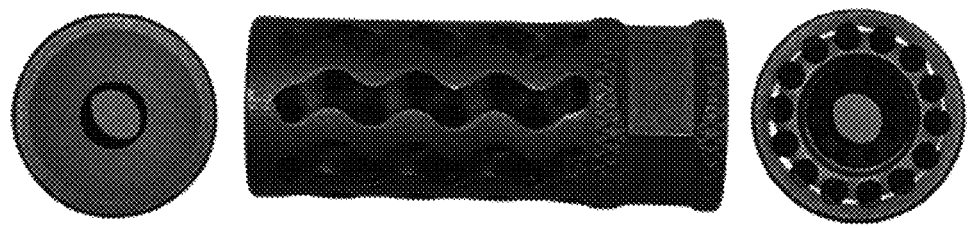
FIG. 22 shows side and end views of Muzzle Device 5 according to one aspect from Example 1.

A muzzle device according to one aspect (Muzzle Device 5) was next installed on the firearm. Muzzle Device 5 is shown in FIG. 22. Muzzle Device 5 includes a length of 2.318 inches, a diameter of 0.890 inches, and a weight of 3.17 oz. The firearm with Muzzle Device 5 produced a muzzle flash having a generally circular shape and with a diameter of approximately 8.94 inches at a distance of approximately 2.55 inches from the muzzle. The flash of Muzzle Device 5 was 67% of the flash with no muzzle device. Thus, Muzzle Device 5 reduced the flash compared to the firearm with no muzzle device.

Figure 23:
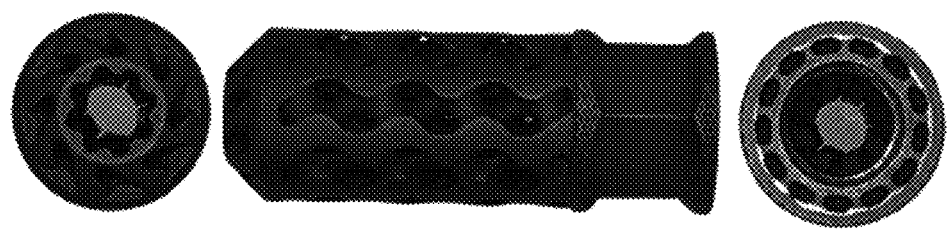
FIG. 23 shows side and end views of Muzzle Device 6 according to one aspect from Example 1.

A muzzle device according to one aspect (Muzzle Device 6) was next installed on the firearm. Muzzle Device 6 is shown in FIG. 23. Muzzle Device 6 includes a length of 2.348 inches, a diameter of 0.845 inches, and a weight of 2.86 oz. The firearm with Muzzle Device 6 produced a muzzle flash having a generally circular shape and with a diameter of approximately 9.2 inches at a distance of approximately 3.8 inches from the muzzle. The flash of Muzzle Device 6 was 69% of the flash with no muzzle device. Thus, Muzzle Device 6 reduced the flash compared to the firearm with no muzzle device.

Figure 24:
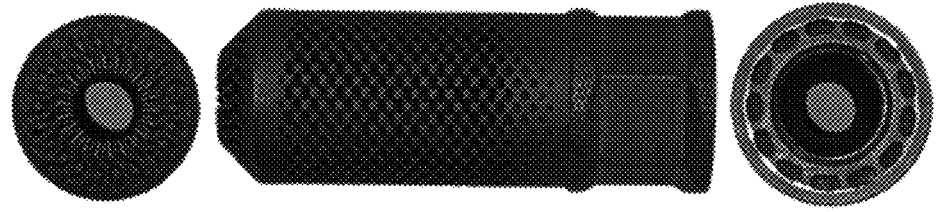
FIG. 24 shows side and end views of Muzzle Device 7 according to one aspect from Example 1.

A muzzle device according to one aspect (Muzzle Device 7) was next installed on the firearm. Muzzle Device 7 is shown in FIG. 24. Muzzle Device 7 includes a length of 2.350 inches, a diameter of 0.845 inches, and a weight of 3.35 oz. The firearm with Muzzle Device 7 produced a muzzle flash having a generally circular shape and with a diameter of approximately 1.5 inches at a distance of approximately 4.1 inches from the muzzle. The flash of Muzzle Device 7 was 11% of the flash with no muzzle device. The muzzle flash is generally dim and significantly less bright than the flash from the firearm with no muzzle device. The muzzle flash from Muzzle Device 7 is shown in FIGS. 20-21. Muzzle Device 7 reduced the flash compared to the firearm with no muzzle device, and reduced flash to a greater extent than Muzzle Devices 1-6.

Figure 25:
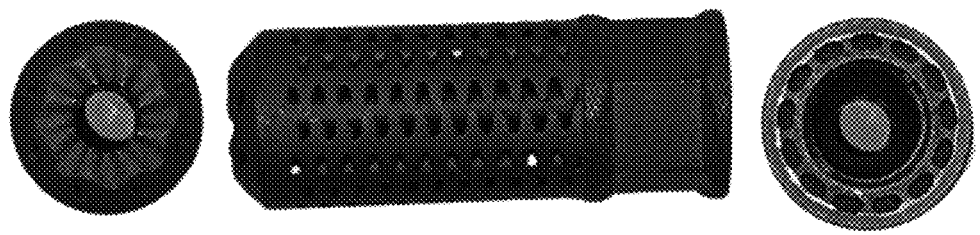
FIG. 25 shows side and end views of Muzzle Device 8 according to one aspect from Example 1.

A muzzle device according to one aspect (Muzzle Device 8) was next installed on the firearm. Muzzle Device 8 is shown in FIG. 25. Muzzle Device 8 includes a length of 2.306 inches, a diameter of 0.850 inches, and a weight of 3.95 oz. The firearm with Muzzle Device 8 produced a muzzle flash having a generally circular shape and with a diameter of approximately 11.7 inches at a distance of approximately 3.9 inches from the muzzle. The flash of Muzzle Device 8 was 87% of the flash with no muzzle device. Thus, Muzzle Device 8 reduced the flash compared to the firearm with no muzzle device.

Figure 26:
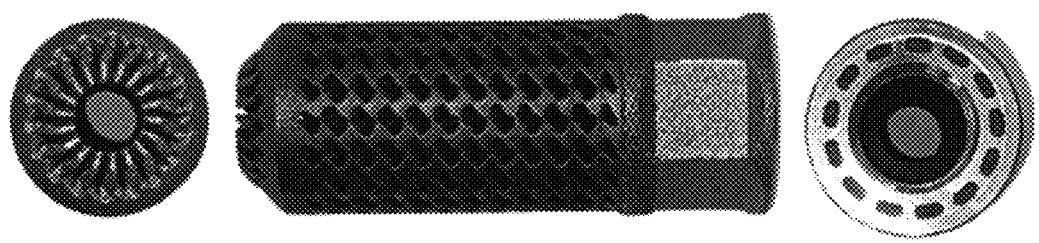
FIG. 26 shows side and end views of Muzzle Device 9 according to one aspect from Example 1.

A muzzle device according to one aspect (Muzzle Device 9) was next installed on the firearm. Muzzle Device 9 is shown in FIG. 26. Muzzle Device 9 includes a length of 2.344 inches, a diameter of 0.847 inches, and a weight of 3.17 oz. The firearm with Muzzle Device 9 produced a muzzle flash having a generally circular shape and with a diameter of approximately 5.3 inches at a distance of approximately 3.74 inches from the muzzle. The flash of Muzzle Device 9 was 40% of the flash with no muzzle device. Thus, Muzzle Device 9 reduced the flash compared to the firearm with no muzzle device, and reduced flash to a greater extent than Muzzle Devices 1, 5, and 6.

Figure 27:
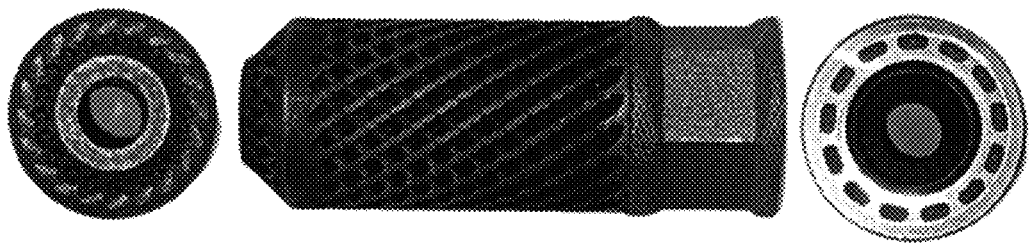
FIG. 27 shows side and end views of Muzzle Device 10 according to one aspect from Example 1.

A muzzle device according to one aspect (Muzzle Device 10) was next installed on the firearm. Muzzle Device 10 is shown in FIG. 27. Muzzle Device 10 includes a length of 2.361 inches, a diameter of 0.850 inches, and a weight of 2.40 oz. The firearm with Muzzle Device 10 produced a muzzle flash having a generally circular shape and with a diameter of approximately 5.2 inches at a distance of approximately 3.5 inches from the muzzle. The flash of Muzzle Device 10 was 39% of the flash with no muzzle device. Thus, Muzzle Device 10 reduced the flash compared to the firearm with no muzzle device, and reduced flash to a greater extent than Muzzle Devices 1, 5, 6, and 9.

The flash size of each muzzle device (e.g., Muzzle Devices 1-10) as a percentage of the flash size of the firearm with no muzzle device is shown in Table 1 below.

TABLE 1

| Muzzle Device | Maximum height of flash (inches) | Percent of flash relative to firearm with no muzzle device (%) |
|---|---|---|
| None | 13.38 | — |
| 1 | 6.17 | 46% |
| 2 | 5.10 | 38% |
| 3 | 1.63 | 12% |
| 4 | 5.3 | 40% |
| 5 | 8.94 | 67% |
| 6 | 9.20 | 69% |
| 7 | 1.50 | 11% |
| 8 | 11.70 | 87% |
| 9 | 5.30 | 40% |
| 10 | 5.20 | 39% |

Figure 28:
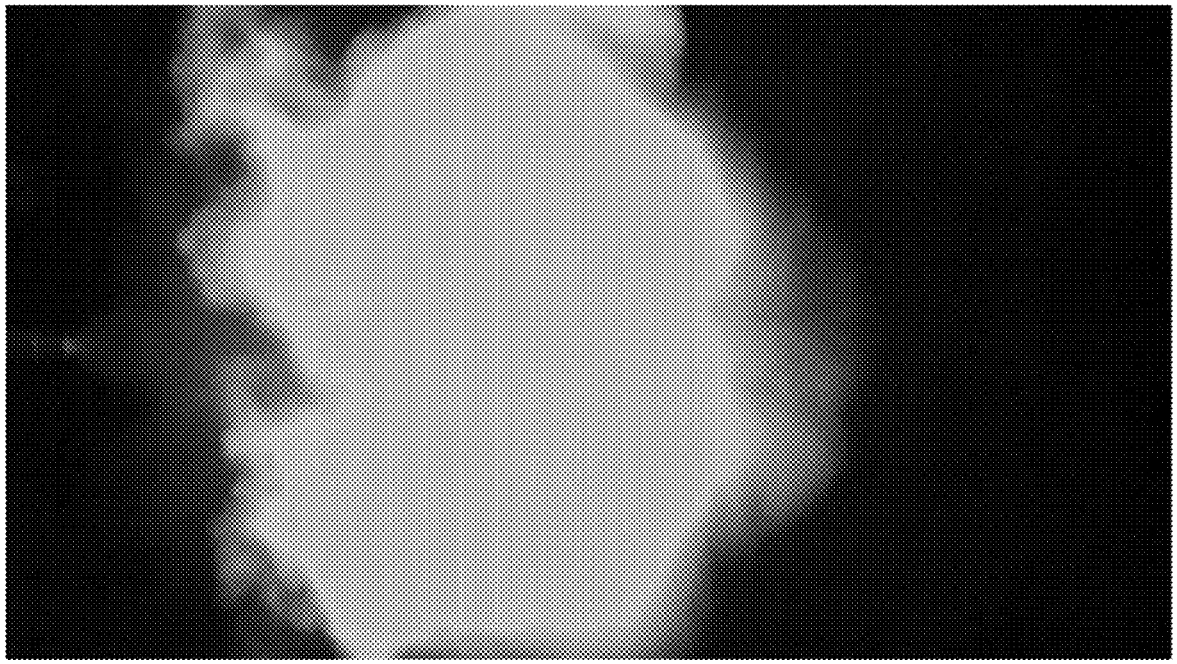
FIG. 28 shows a muzzle flash from a firearm with no muzzle device from Example 1.
Figure 29:
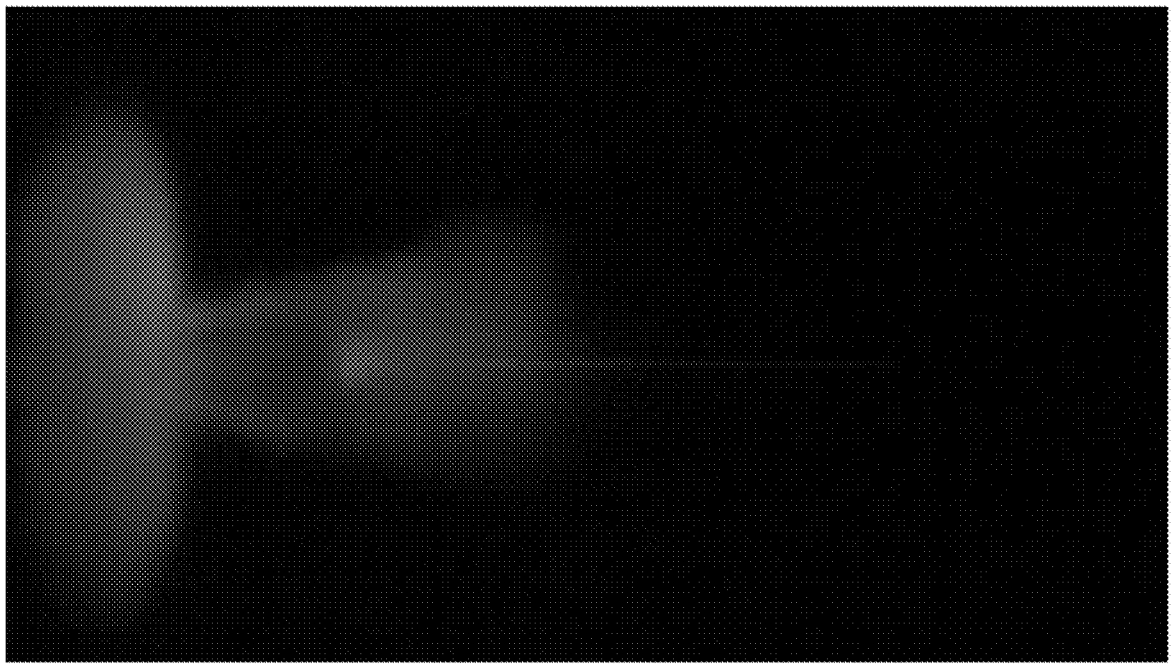
FIG. 29 shows a side view of a muzzle flash from Muzzle Device 7 according to one aspect from Example 1.
Figure 30:
FIG. 30 shows a perspective view of the muzzle flash from Muzzle Device 7 of FIG. 29.

In summary, each of the Muzzle Devices tested reduced the flash of the firearm relative to the firearm with no muzzle device. As discussed above, Muzzle Devices 1-10 are shown in FIGS. 18-27. On average, Muzzle Devices 1-10 ejected post ignition of approximately half the size of the post ignition of the firearm with no muzzle device. Post ignition of the firearm with no muzzle device is shown in FIG. 28. Particularly, Muzzle Devices 3 and 7 provided the greatest flash reduction. The Muzzle Device 7 flash is shown in FIGS. 29-30. Each Muzzle Device tested had comparable dimensions and weight, and thus variation in performance is believed to be the result of the muzzle device geometry. Post ignition of the muzzle devices according to one or more aspects described herein also varied in brightness, distance from the muzzle of the firearm, and in the type of gas dispersion (e.g., direction of dispersion and dispersion in either in jets or uniformly).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

What is claimed is:

1. A muzzle device for a firearm, comprising:
   an additively manufactured body, comprising:
      a sidewall;
      a first end;
      a second end opposite the first end; and
      a central bore extending from the first end to the second end;
   wherein at least the sidewall and the second end of the body comprises a lattice of triply periodic minimal surfaces that define an interconnected network of channels extending through the body such that gases produced by the firearm flow from the central bore through the interconnected network of channels to cool the gases.

2. The muzzle device of claim 1, further comprising a connector integrally formed at the first end of the body, wherein the connector is configured to secure the muzzle device to a barrel of the firearm.

3. The muzzle device of claim 1, wherein the triply periodic minimal surface is selected from the group of Gyroid, Schwarz P, Diamond, Neovius, IWP, Schwarz D, PW hybrid, Holes, Icosahedron, L, and Schwarz G.

4. The muzzle device of claim 3, wherein the triply periodic minimal surface is a Gyroid.

5. The muzzle device of claim 1, wherein a surface area of the body is in a range of 7,000 mm2 to 28,000 mm2.

6. The muzzle device of claim 5, wherein the surface area of the body is in a range of 7,250 mm2 to 20,000 mm2.

7. The muzzle device of claim 1, wherein the body comprises a plurality of openings on the exterior surface of the body such that the gases flow through the interconnected network of channels and out of the muzzle device through the plurality of openings.

8. The muzzle device of claim 7, wherein the plurality of openings increases in diameter from the first end of the body toward the second end of the body.

9. The muzzle device of claim 1, wherein the lattice of triply periodic minimal surfaces extends from the first end to the second end of the body.

10. A muzzle device for a firearm, comprising:
    a body comprising:
       a first end;
       a second end opposite the first end; and
       a central bore defined by the body and extending from the first end to the second end; and
    a tubular outer shell surrounding the body;
    wherein the body comprises a lattice of triply periodic minimal surfaces at least at the second end of the body, wherein the lattice of triply periodic minimal surfaces defines an interconnected network of channels extending through the body so that gases produced by the firearm flow from the central bore into the interconnected network of channels.

11. The muzzle device of claim 10, wherein the outer shell comprises a surface pattern extending over the body from the second end to the first end.

12. The muzzle device of claim 10, wherein a surface area of the body is in a range of 7,000 mm2 to 28,000 mm2.

13. The muzzle device of claim 10, wherein the outer shell comprises a first material, and wherein the body comprises a second material.

14. The muzzle device of claim 10, wherein the body is additively manufactured from a metal powder.

15. The muzzle device of claim 14, wherein the metal powder is selected from the group of stainless steel, Inconel, and titanium.

16. The muzzle device of claim 10, wherein the gases produced by the firearm flow both radially and laterally from the central bore into the interconnected network of channels defined by the lattice of triply periodic minimal surfaces.

\* \* \* \* \*